United States Patent
Leiva (10) Patent No.: US 11,572,159 B2
(45) Date of Patent: Feb. 7, 2023

(54) SEGMENTED HEAT SHIELD WITH REDUCED INTERLAYER THERMAL CONDUCTION

(71) Applicant: GOODRICH CORPORATION, Charlotte, NC (US)

(72) Inventor: Orly Leiva, Miamisburg, OH (US)

(73) Assignee: Goodrich Corporation, Charlotte, NC (US)

( * ) Notice: Subject to any disclaimer, the term of this patent is extended or adjusted under 35 U.S.C. 154(b) by 748 days.

(21) Appl. No.: 16/173,935

(22) Filed: Oct. 29, 2018

(65) Prior Publication Data
US 2020/0130818 A1 Apr. 30, 2020

(51) Int. Cl.
*B64C 25/36* (2006.01)
*B60B 27/00* (2006.01)
*B64C 25/42* (2006.01)

(52) U.S. Cl.
CPC .......... *B64C 25/36* (2013.01); *B60B 27/0052* (2013.01); *B64C 25/42* (2013.01); *B60B 2900/212* (2013.01); *B60Y 2200/51* (2013.01); *B60Y 2410/114* (2013.01)

(58) Field of Classification Search
CPC ... B64C 25/36; B64C 25/42; B60Y 2410/114; F16D 55/36; F16D 65/10; F16D 65/78; F16D 65/82; F16D 65/827; B60B 19/10; B60B 2900/513; F15D 1/005
See application file for complete search history.

(56) References Cited

U.S. PATENT DOCUMENTS

| | | | |
|---|---|---|---|
| 4,017,123 A * | 4/1977 | Horner | B60C 23/18 301/6.91 |
| 4,344,591 A | 8/1982 | Jackson | |
| 5,002,342 A | 3/1991 | Dyko | |
| 7,051,845 B2 * | 5/2006 | Thorp | F16D 55/36 188/71.6 |
| 7,851,069 B2 | 12/2010 | Starr | |
| 8,668,276 B2 * | 3/2014 | Hall | B64C 25/36 301/6.2 |
| 2009/0071763 A1 | 3/2009 | Thorp et al. | |
| 2019/0241257 A1 * | 8/2019 | Leiva | B32B 15/01 |

FOREIGN PATENT DOCUMENTS

EP 3159571 4/2017
WO 2007118254 10/2007

OTHER PUBLICATIONS

European Patent Office, European Search Report dated Mar. 19, 2020 in Application No. 19205871.7.

* cited by examiner

*Primary Examiner* — Jason R Bellinger
*Assistant Examiner* — Emily G. Castonguay
(74) *Attorney, Agent, or Firm* — Snell & Wilmer L.L.P.

(57) ABSTRACT

A heat shield assembly is disclosed. In various embodiments, the heat shield assembly defines a first circumferential side and a second circumferential side and an inboard end and an outboard end and includes a first layer defining a first surface of the heat shield assembly and having a first tab member disposed proximate the inboard end at the first circumferential side and a second tab member disposed proximate the outboard end at the first circumferential side; and a second layer defining a second surface of the heat shield assembly and having one or more first crimped portions extending along the first circumferential side and configured to engage the first tab member and the second tab member.

15 Claims, 7 Drawing Sheets

SEGMENTED HEAT SHIELD WITH REDUCED INTERLAYER THERMAL CONDUCTION

FIELD

The present disclosure relates to aircraft wheel and brake assemblies and, more particularly, to heat shields used in aircraft wheel and brake assemblies.

BACKGROUND

Aircraft typically utilize brake systems on wheels to slow or stop the aircraft during landings, taxiing and rejected takeoffs. The brake systems generally employ a brake stack comprising a series of friction disks that may be forced into sliding contact with one another during brake actuation to slow or stop the aircraft. Under various conditions, brake actuation may generate high temperatures in the vicinity of the brake stack that can adversely impact or damage wheels or tires mounted thereon. A heat shield positioned between the brake stack and the wheel can mitigate thermal damage.

SUMMARY

A heat shield assembly is disclosed. In various embodiments, the heat shield assembly defines a first circumferential side and a second circumferential side and an inboard end and an outboard end and includes a first layer defining a first surface of the heat shield assembly and having a first tab member disposed proximate the inboard end at the first circumferential side and a second tab member disposed proximate the outboard end at the first circumferential side; and a second layer defining a second surface of the heat shield assembly and having one or more first crimped portions extending along the first circumferential side and configured to engage the first tab member and the second tab member.

In various embodiments, an intermediate layer is disposed between the first layer and the second layer. In various embodiments, the intermediate layer comprises a first plurality of dimples oriented toward the first layer. In various embodiments, the intermediate layer comprises a second plurality of dimples oriented toward the second layer. In various embodiments, the first plurality of dimples is configured to contact the first layer and the second plurality of dimples is configured to contact the second layer.

In various embodiments, the first layer includes a third tab member disposed proximate the inboard end at the second circumferential side and a fourth tab member disposed proximate the outboard end at the second circumferential side and the second layer includes one or more second crimped portions extending along the second circumferential side and configured to engage the third tab member and the fourth tab member.

In various embodiments, the first layer is an inner layer defining a radially inner surface of the heat shield assembly and the second layer is an outer layer defining a radially outer surface of the heat shield assembly. In various embodiments, the first layer is an outer layer defining a radially outer surface of the heat shield assembly and the second layer is an inner layer defining a radially inner surface of the heat shield assembly.

In various embodiments, the inboard end includes an aperture configured to receive a fastener extending between a torque bar and a wheel. In various embodiments, the inboard end includes a chin ring extending between the first circumferential side and the second circumferential side.

An assembly is disclosed. In various embodiments, the assembly includes a wheel having a wheel well and configured to rotate about an axis; a brake mechanism disposed radially inward of the wheel well; and a heat shield disposed radially inward of the wheel well and radially outward of the brake mechanism. In various embodiments, the heat shield defines a first circumferential side and a second circumferential side and an inboard end and an outboard end and includes a first layer having a first tab member disposed proximate the inboard end at the first circumferential side and a second tab member disposed proximate the outboard end at the first circumferential side; and a second layer having one or more first crimped portions extending along the first circumferential side and configured to engage the first tab member and the second tab member.

In various embodiments, an intermediate layer is disposed between the first layer and the second layer. In various embodiments, the intermediate layer comprises a first plurality of dimples oriented toward the first layer and a second plurality of dimples oriented toward the second layer. In various embodiments, the first plurality of dimples is configured to contact the first layer and the second plurality of dimples is configured to contact the second layer.

In various embodiments, the first layer includes a third tab member disposed proximate the inboard end at the second circumferential side and a fourth tab member disposed proximate the outboard end at the second circumferential side and the second layer includes one or more second crimped portions extending along the second circumferential side and configured to engage the third tab member and the fourth tab member.

In various embodiments, the first layer is an inner layer defining a radially inner surface of the heat shield assembly and the second layer is an outer layer defining a radially outer surface of the heat shield. In various embodiments, the inboard end includes an aperture configured to receive a fastener extending between a torque bar and the wheel.

A method of manufacturing a heat shield segment is disclosed. In various embodiments, the method includes the steps of forming a first surface from a first layer of material and a second surface from a second layer of material; forming one or more tab members along a first edge of the first layer of material; forming one or more crimped-portions along a second edge of the second layer of material corresponding to the one or more tab members; and joining the first layer of material and the second layer of material at the one or more tab members and the one or more crimped-portions to form the heat shield segment.

In various embodiments, the method further includes positioning a dimpled structure intermediate the first layer of material and the second layer of material. In various embodiments, the dimpled structure includes a first plurality of dimples configured to contact the first layer of material and a second plurality of dimples configured to contact the second layer of material.

BRIEF DESCRIPTION OF THE DRAWINGS

The accompanying drawings illustrate various embodiments employing the principles described herein and are a part of the specification. The illustrated embodiments are meant for description and not to limit the scope of the claims.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

As used herein, a first component that is "radially outward" of a second component means that the first component is positioned at a greater distance away from a common axis than the second component. A first component that is "radially inward" of a second component means that the first component is positioned closer to the common axis than the second component. In the case of components that rotate circumferentially about a common axis, a first component that is radially inward of a second component rotates through a circumferentially shorter path than the second component. As used herein, "distal" refers to the direction outward, or generally, away from a reference component. As used herein, "proximal" and/or "proximate" refer to a direction inward, or generally, towards the reference component. All ranges may include the upper and lower values, and all ranges and ratio limits disclosed herein may be combined. Unless specifically stated otherwise, reference to "a," "an" or "the" may include one or more than one and reference to an item in the singular may also include the item in the plural.

Figure 1A:
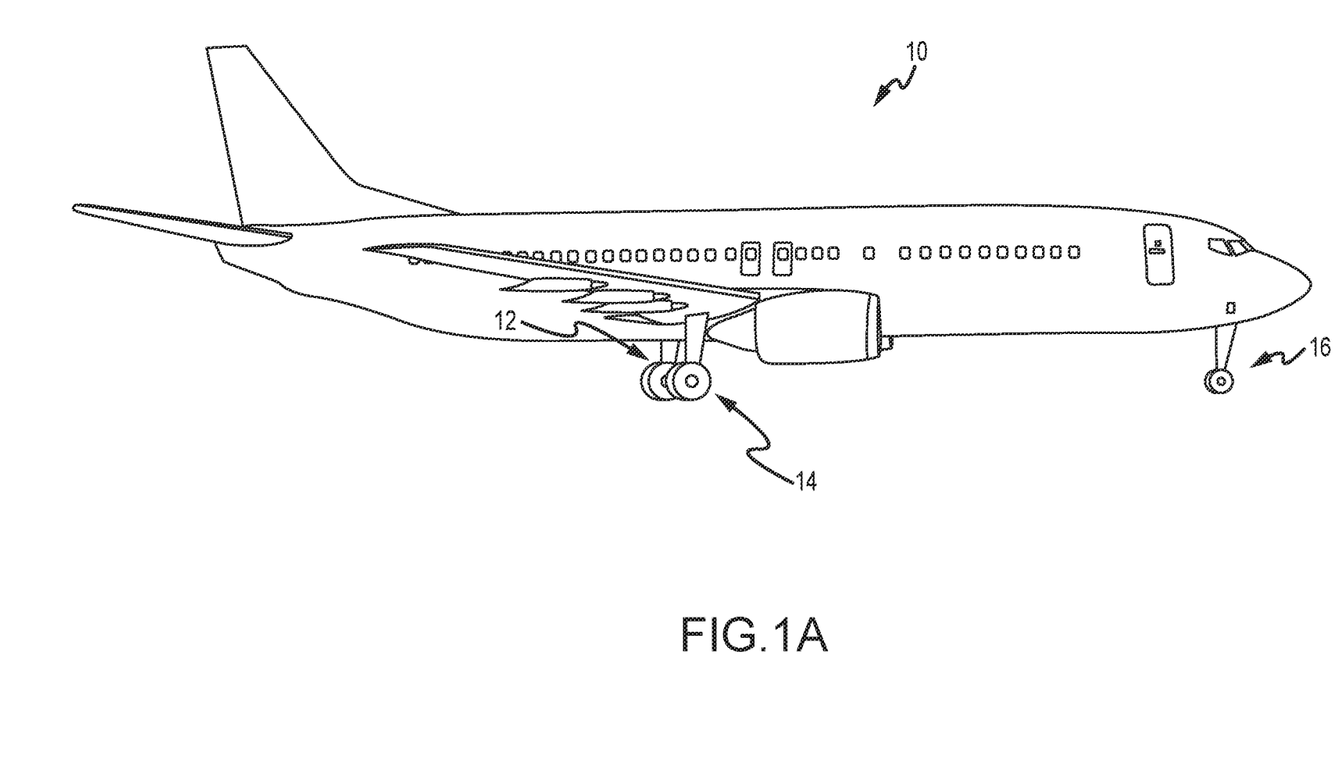
FIG. 1A illustrates an exemplary aircraft having a brake system, in accordance with various embodiments.

Referring to FIG. 1A, in accordance with various embodiments, an aircraft 10 is illustrated. The aircraft 10 includes landing gear, which may include a left main landing gear 12, a right main landing gear 14 and a nose landing gear 16. The landing gear support the aircraft 10 when it is not flying, allowing the aircraft 10 to taxi, take off and land without damage. While the disclosure refers to the three landing gear configurations just referred, the disclosure nevertheless contemplates any number of landing gear configurations.

Figure 1B:
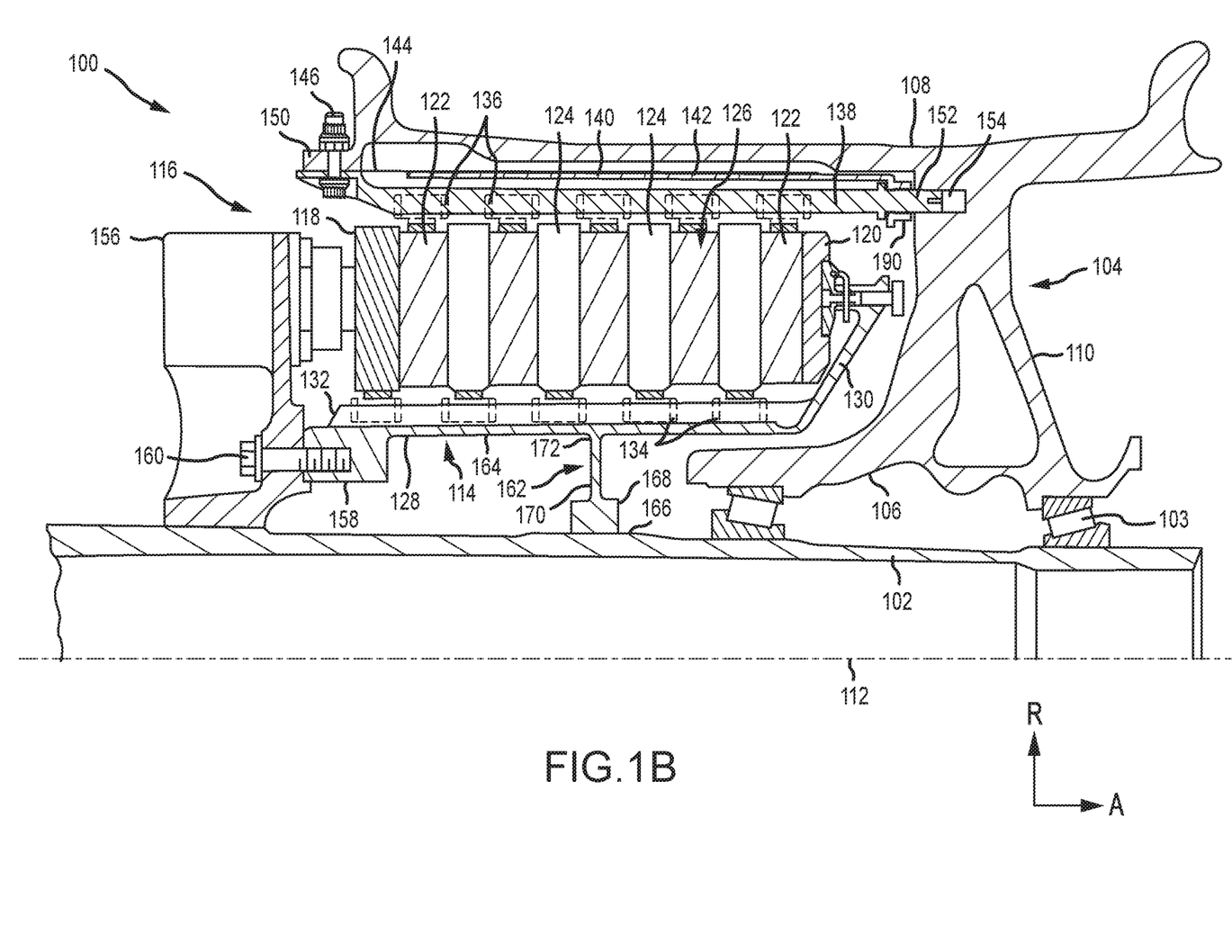
FIG. 1B illustrates a cross-sectional view of a brake assembly, in accordance with various embodiments.

Referring now to FIG. 1B, there is schematically depicted a brake mechanism 100 mounted on an axle 102 for use with a wheel 104 disposed on and configured to rotate about the axle 102 via one or more bearing assemblies 103. The wheel 104 includes a hub 106, a wheel well 108 concentric about the hub 106 and a web portion 110 interconnecting the hub 106 and the wheel well 108. A central axis 112 extends through the axle 102 and defines a center of rotation of the wheel 104. A torque plate barrel 114 (sometimes referred to as a torque tube or barrel or a torque plate or back leg) is aligned concentrically with the hub 106, and the wheel 104 is rotatable relative to the torque plate barrel 114.

The brake mechanism 100 includes a piston assembly 116, a pressure plate 118 disposed adjacent the piston assembly 116, an end plate 120 positioned a distal location from the piston assembly 116, and a plurality of rotor disks 122 interleaved with a plurality of stator disks 124 positioned intermediate the pressure plate 118 and the end plate 120. The pressure plate 118, the plurality of rotor disks 122, the plurality of stator disks 124 and the end plate 120 together form a brake heat sink or brake stack 126. The pressure plate 118, the end plate 120 and the plurality of stator disks 124 are mounted to the torque plate barrel 114 and remain rotationally stationary relative to the axle 102.

The torque plate barrel 114 may include an annular barrel or torque tube 128 and an annular plate or back leg 130. The back leg 130 is disposed at an end distal from the piston assembly 116 and may be made monolithic with the torque tube 128, as illustrated in FIG. 1B, or may be made as a separate annular piece and suitably connected to the torque tube 128. The torque tube 128 has a plurality of circumferentially spaced and axially extending splines 132 disposed on an outer surface of the torque tube 128. The plurality of stator disks 124 and the pressure plate 118 include notches or stator slots 134 on an inner periphery of the disks and the plate for engagement with the splines 132, such that each disk and the plate are axially slidable with respect to the torque tube 128.

The end plate 120 is suitably connected to the back leg 130 of the torque plate barrel 114 and is held non-rotatable, together with the plurality of stator disks 124 and the pressure plate 118, during a braking action. The plurality of rotor disks 122, interleaved between the pressure plate 118, the end plate 120 and the plurality of stator disks 124, each have a plurality of circumferentially spaced notches or rotor lugs 136 along an outer periphery of each disk for engagement with a plurality of torque bars 138 that is secured to or made monolithic with an inner periphery of the wheel 104.

An actuating mechanism for the brake mechanism 100 includes a plurality of piston assemblies, including the piston assembly 116, circumferentially spaced around an annular piston housing 156 (only one piston assembly is illustrated in FIG. 1B). Upon actuation, the plurality of piston assemblies affect a braking action by urging the pressure plate 118 and the plurality of stator disks 124 into frictional engagement with the plurality of rotor disks 122 and against the end plate 120. Fluid or hydraulic pressure, mechanical springs or electric actuators, among other mechanisms, may be used to actuate the plurality of piston assemblies. Through compression of the plurality of rotor disks 122 and the plurality of stator disks 124 between the pressure plate 118 and the end plate 120, the resulting frictional contact slows or stops or otherwise prevents rotation of the wheel 104. The plurality of rotor disks 122 and the plurality of stator disks 124 are fabricated from various materials, such as ceramic matrix composites, that enable the brake disks to withstand and dissipate the heat generated during and following a braking action.

The torque plate barrel 114 is secured to a stationary portion of the landing gear such as the axle 102, preventing the torque plate barrel 114 and the plurality of stator disks 124 from rotating during braking of the aircraft. The torque tube 128 portion of the torque plate barrel 114 may be attached to the annular piston housing 156 via an annular mounting surface 158, wherein bolt fasteners 160 secure the torque plate barrel 114 to the annular piston housing 156. A spacer member or pedestal 162 is positioned between an inner diameter surface 164 of the torque tube 128 and an outer diameter surface 166 of the axle 102. The pedestal 162 includes a radially inner surface or foot 168 for engaging the axle 102, a web portion 170 radially outward of the foot 168 and a head portion 172 for engaging the inner diameter surface 164 of the torque tube 128. The pedestal 162 augments support of the torque plate barrel 114 within the brake mechanism 100 generally and, more particularly, against the axle 102. The pedestal 162 may be made monolithic with the torque tube 128 portion of the torque plate barrel 114.

A heat shield 140 is secured directly or indirectly to the wheel 104 between a radially inward surface of the wheel well 108 and the plurality of torque bars 138. As illustrated in FIG. 1B, the heat shield 140 is concentric with the wheel well 108 and may have a plurality of heat shield sections 142 disposed between respective, adjacent pairs of the plurality of torque bars 138. The heat shield 140, or heat shield sections 142, is spaced from the radially inward surface of the wheel well 108 and secured in place by heat shield tabs 190, such that the heat shield 140, or heat shield sections 142, is disposed generally parallel to the axis of rotation or central axis 112 of the wheel 104 and intermediate the plurality of torque bars 138 and the radially inward surface of the wheel well 108. In various embodiments, including for heavy-duty applications, the heat shield 140, or heat shield sections 142, may be further secured in place by heat shield carriers 144.

The plurality of torque bars 138 is attached at axially inboard ends to the wheel 104 by torque bar bolts 146. The torque bar bolts 146 extend through respective holes in a flange 150 provided on the wheel 104 as shown, which flange 150 for purposes of the present description is intended to be considered as part of the wheel well 108. Each of the plurality of torque bars 138 may include a pin 152 or similar member at its axially outboard end (i.e., the end opposite the torque bar bolts 146) that is received within a hole 154 disposed proximate the web portion 110 of the wheel 104. The heat shield 140, or heat shield sections 142, is positioned adjacent a radially inward surface of the wheel well 108 and secured in place by the heat shield tabs 190.

Figure 2:
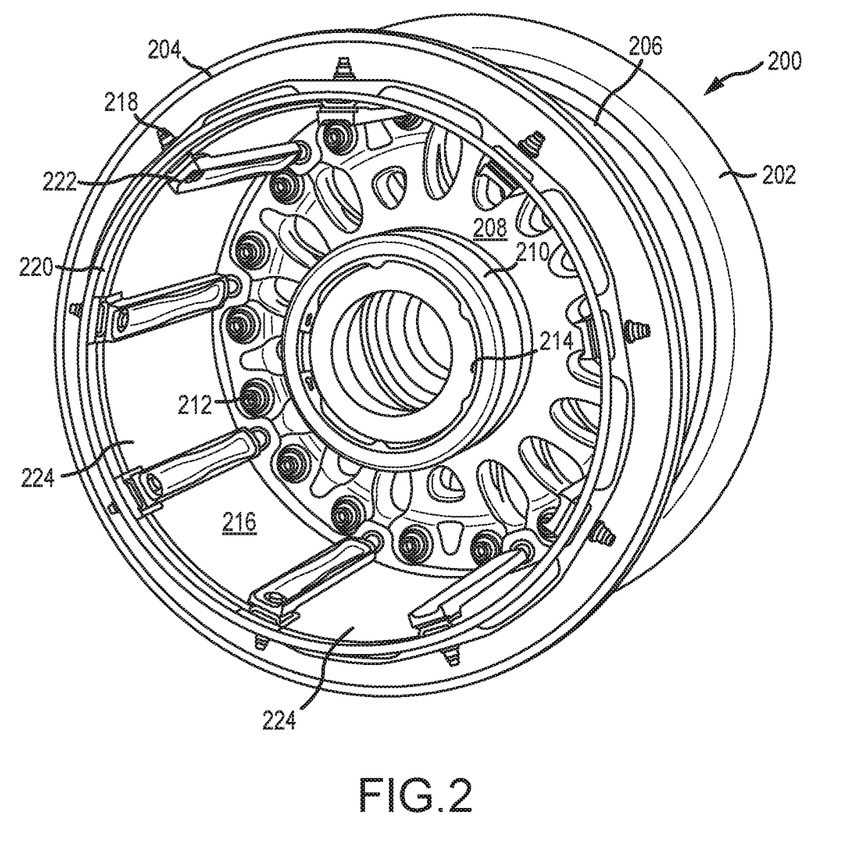
FIG. 2 illustrates a wheel having a heat shield, in accordance with various embodiments.

Referring now to FIG. 2, a wheel 200 having a segmented heat shield is provided. In various embodiments, the wheel 200 includes an outboard lip 202, coupled to a wheel disk 208 by a plurality of wheel tie bolts 212, and an inboard lip 204 defining a rim 206 about the wheel disk 208. A hub 210 is centered through the wheel disk 208 and may comprise one or more bearings 214. The rim 206 extends axially with respect to the hub 210 about a circumference of the wheel disk 208. A segmented heat shield 216 is disposed radially inward of the rim 206 between the inboard lip 204 and the wheel disk 208 of the wheel 200. In various embodiments, the segmented heat shield 216 includes a cylindrical structure extending circumferentially about an axis of the hub 210 and around an inner diameter of the rim 206. In various embodiments, the segmented heat shield 216 may be coupled proximate the rim 206 by a plurality of fasteners 218 and may be held proximate the rim 206, with a chin ring 220 proximate the inboard lip 204, by an interference between the segmented heat shield 216 and a plurality of torque bars 222. In various embodiments, the plurality of torque bars 222 may be coupled to the wheel disk 208 at an outboard end and may be coupled to the segmented heat shield 216 at an inboard end proximate the chin ring 220 by the plurality of fasteners 218. As described below, in various embodiments, the segmented heat shield 216 comprises a plurality of heat shield segments 224 that are arranged and assembled circumferentially proximate the inner diameter of the wheel 200.

Figure 3A:
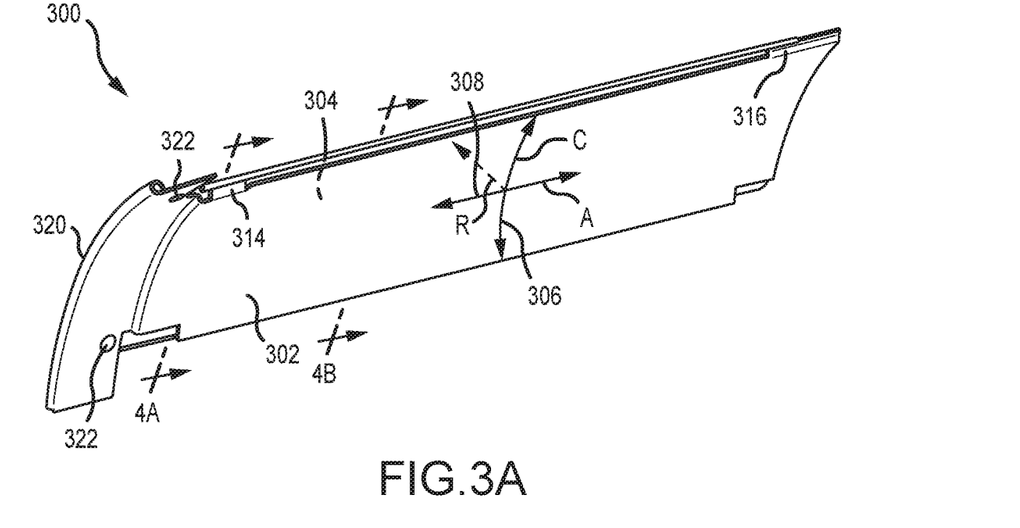
FIGS. 3A and 3B illustrate a segmented heat shield, in accordance with various embodiments.
Figure 3B:
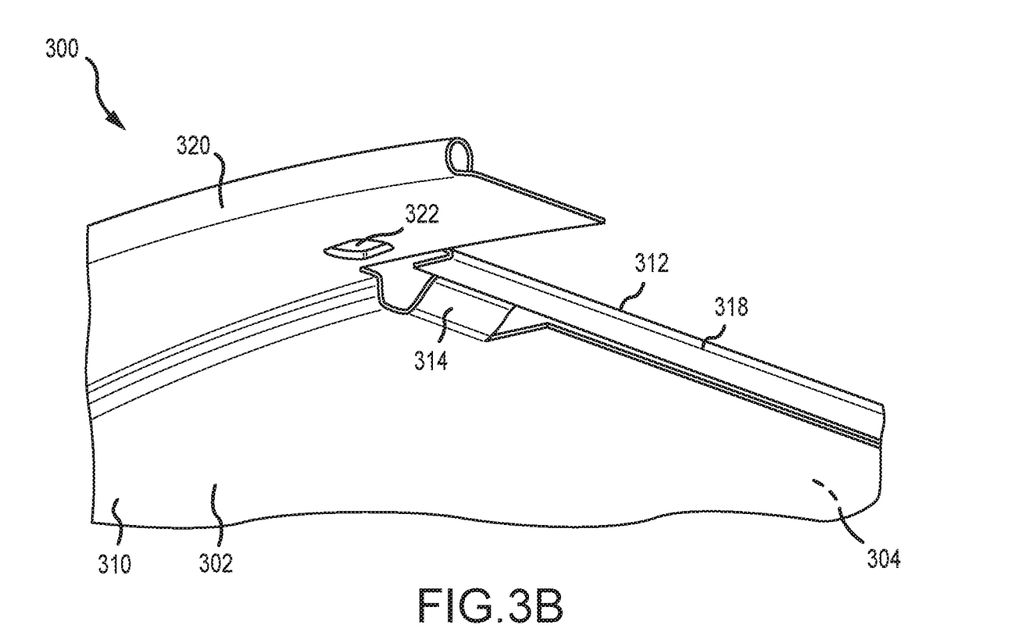

Referring now to FIGS. 3A and 3B, a heat shield segment 300 is illustrated, in accordance with various embodiments. The heat shield segment 300 defines an inner surface 302 (or first surface) and an outer surface 304 (or second surface) with respect to a radial direction R. In various embodiments, the heat shield segment 300 extends a circumferential distance 306 and an axial distance 308, respectively, in both the circumferential direction C and the axial direction A. In various embodiments, the circumferential distance 306 may span the entire circumference of an inner surface of a wheel, to form a single-segment heat shield, or may span a fraction of the entire circumference, to form a multiple-segment heat shield. In various embodiments, for example, the circumferential distance 306 may equal the distance between adjacent pairs of a plurality of torque bars, thereby forming a multiple-segment heat shield, where the number of heat shield segments equals the number of torque bars.

In various embodiments, the inner surface 302 may be formed using an inner layer of material 310 (or first layer of material) and the outer surface 304 may be formed using an outer layer of material 312 (or second layer of material). In various embodiments, the inner layer of material 310 and the outer layer of material 312 may comprise sheets of metallic material. As described further below, in various embodiments, one or more intermediate layers may be disposed intermediate the inner layer of material 310 and the outer layer of material 312. In various embodiments, the inner surface 302 includes an inboard tab member 314 (or first tab member) and an outboard tab member 316 (or second tab member). The inboard tab member 314 and the outboard tab member 316 are configured to engage a crimped portion 318 of the outer surface 304. In various embodiments, the crimped portion 318 is formed by crimping the outer layer of material 312 along at least a portion (or portions) of the axial distance 308 of the outer surface 304 in order to engage one or more corresponding tab members. In a similar fashion, the inboard tab member 314 and the outboard tab member 316 may be formed by bending respective portions of the inner layer of material 310 into tab configurations. In various embodiments, a chin ring 320 may also be formed from the inner layer of material 310, as illustrated, or from the outer layer of material 312. In various embodiments, one or more apertures 322 may extend through one or both of the inner layer of material 310 and the outer layer of material 312 to assist in attaching the heat shield segment to a wheel. For example, an aperture may be configured to receive a fastener extending between a torque bar and a wheel, as described above with reference to FIG. 2.

While the foregoing describes the tab members being formed from the inner layer of material and the crimped portion being formed from the outer layer of material, the disclosure contemplates no preference in this regard and, further, contemplates the tab members and the crimped portion may be formed from either layers of material—e.g., the tab members may be formed from the outer layer of material and the crimped portion may be formed from the inner layer of material. Further, the disclosure contemplates the first surface or the first layer of material may comprise, respectively, either the inner surface or the outer surface or the inner layer of material or the outer layer of material, as may the second surface and the second layer of material.

Figure 4A:
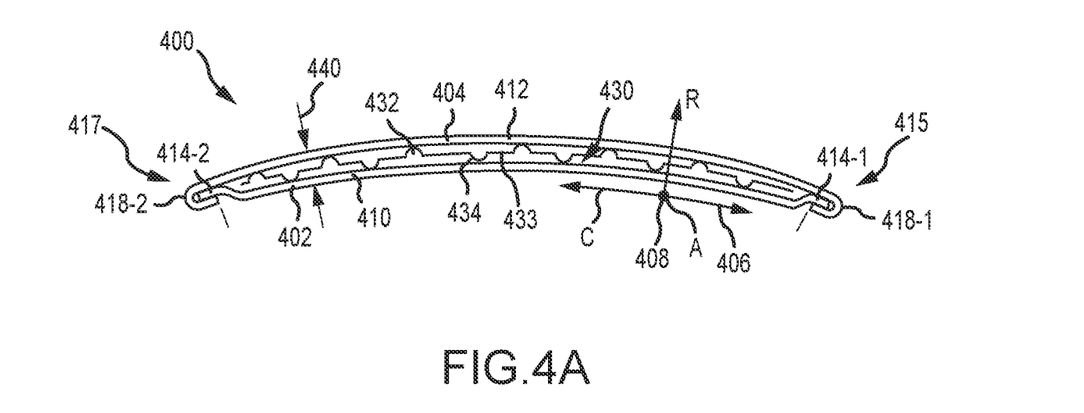
FIGS. 4A, 4B and 4C illustrate a segmented heat shield, in accordance with various embodiments.
Figure 4B:
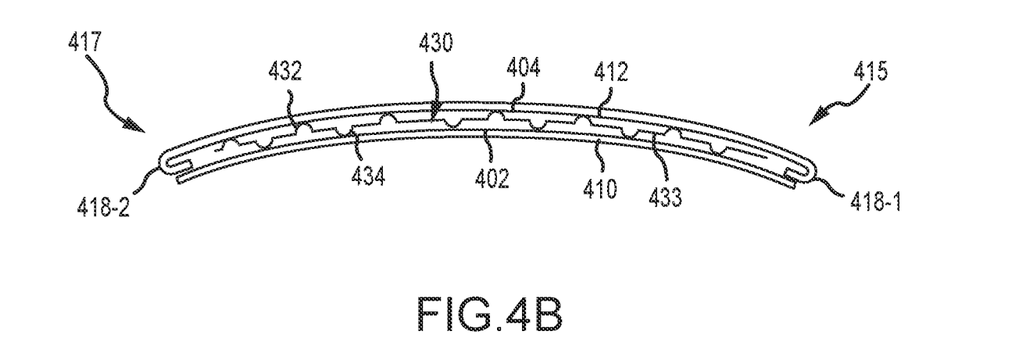

Referring to FIGS. 4A and 4B, cross sectional views of a heat shield segment 400, viewing in an axial direction from an inboard end, are illustrated. In various embodiments, the heat shield segment 400 defines an inner surface 402 (or first surface) and an outer surface 404 (or second surface) with respect to a radial direction R, both surfaces extending in a circumferential direction C and an axial direction A as is the case for the heat shield segment 300 described above with reference to FIG. 3A. In various embodiments, the heat shield segment 400 extends a circumferential distance 406 and an axial distance 408, respectively, in the circumferential direction C and the axial direction A. In various embodiments, the circumferential distance 406 may span the entire circumference of an inner surface of a wheel, to form a single-segment heat shield, or may span a fraction of the entire circumference, to form a multiple-segment heat shield. In various embodiments, for example, the circumferential distance 406 may equal the distance between adjacent pairs of a plurality of torque bars, thereby forming a multiple-segment heat shield, where the number of heat shield segments equals the number of torque bars.

Figure 4C:
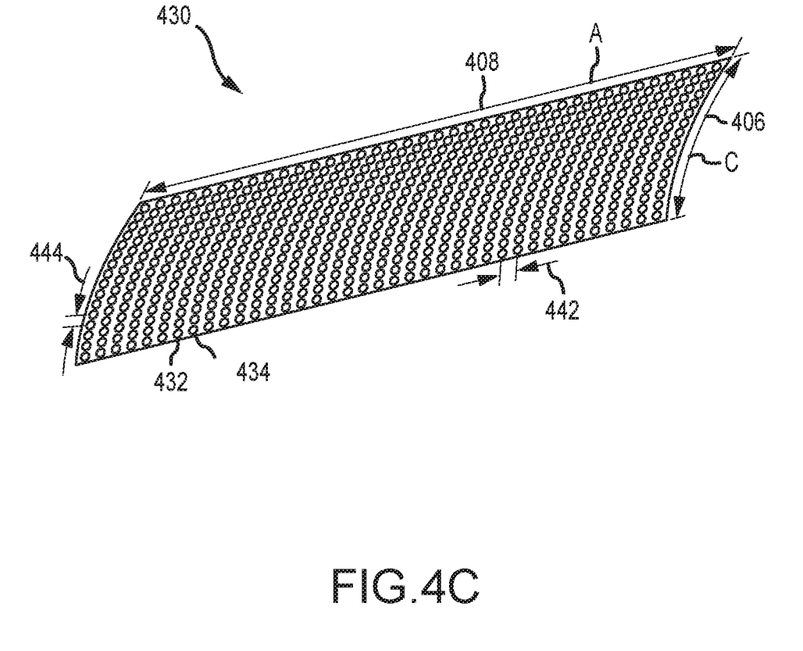

In various embodiments, the inner surface 402 (or first surface) may be formed using an inner layer of material 410 (or first layer of material or first layer) and the outer surface 404 (or second surface) may be formed using an outer layer of material 412 (or second layer of material or second layer). In various embodiments, the inner layer of material 410 and the outer layer of material 412 may comprise sheets of metallic material. In various embodiments, an intermediate layer of material is disposed between the inner layer of material 410 and the outer layer of material 412. In various embodiments, the intermediate layer of material comprises a dimpled structure 430. As illustrated in each of FIGS. 4A, 4B and 4C, in various embodiments, the dimpled structure 430 may comprise a plurality of outer dimples 432, configured to extend radially outward from an intermediate sheet of material 433 and make contact with the outer layer of material 412, and a plurality of inner dimples 434, configured to extend radially inward from the intermediate sheet of material 433 and make contact with the inner layer of material 410. In various embodiments, the dimpled structure 430 may be sandwiched between the inner layer of material 410 and the outer layer of material 412 and restrained from movement by an interference fit between the dimples and the respective surfaces of the layers of material. In various embodiments, the dimpled structure 430 may be secured to one or both of the inner layer of material 410 and the outer layer of material 412 by welding or rivets or other suitable means of attachment. In various embodiments, the dimpled structure 430 may be positioned intermediate the inner layer of material 410 and the outer layer of material 412 together with additional dimpled structures or other layers of material.

In various embodiments, the inner surface 402 includes a first inboard tab member 414-1 (or first tab member) on a first circumferential side 415 of the heat shield segment 400 and a second inboard tab member 414-2 (or second tab member) on a second circumferential side 417 of the heat shield segment 400. In similar fashion, the inner surface 402 includes a first outboard tab member (or third tab member) on the first circumferential side 415 of the heat shield segment 400 and a second outboard tab member (or fourth tab member) on the second circumferential side 417 of the heat shield segment 400. Although the outboard tab members are not shown in FIGS. 4A, 4B and 4C, the outboard tab members are similar in structure to the outboard tab member 316 described above with reference to FIG. 3A and the first inboard tab member 414-1 and the second inboard tab member 414-2 just described. The first inboard tab member 414-1 and the second inboard tab member 414-2 (together with the first outboard tab member and the second outboard tab member just described) are configured to engage a first crimped portion 418-1 of the outer surface 404 and a second crimped portion 418-2 of the outer surface 404, respectively.

In various embodiments, the first crimped portion 418-1 and the second crimped portion 418-2 are formed by crimping the outer layer of material 412 along at least a portion (or portions) of the axial distance 408 of the outer surface 404 at both the first circumferential side 415 and the second circumferential side 417 in order to engage one or more corresponding tab members. In a similar fashion, the first inboard tab member 414-1 and the second inboard tab member 414-2, together with the respective outboard tab members, may be formed by bending respective portions of the inner layer of material 410 into tab configurations, similar to the inboard tab member 314 and the outboard tab member 316 described above with reference to FIGS. 3A and 3B.

In various embodiments, a thickness 440 of the heat shield segment 400 may be between 0.005 inches (0.127 mm) and 1.5 inches (38.1 mm), or between 0.05 inch (1.27 mm) and 1.0 inches (25.4 mm), or between 0.1 inches (2.54 mm) and 0.5 inches (12.7 mm). In various embodiments, the axial distance 408 of the heat shield segment 400 defined by an axial dimension of a wheel, such as, for example, the distance between the inboard lip 204 and the wheel disk 208, described above with reference to FIG. 2. In various embodiments the various components of the heat shield segment 400, including the inner layer of material 410, the outer layer of material 412 and the dimpled structure 430, may be made of steel, stainless steel, titanium, titanium alloy, aluminum, aluminum alloy, or may comprise a surface treated metal or metal alloy. In various embodiments, an axial spacing 442 of adjacent dimples and a circumferential spacing 444 of adjacent dimples, e.g., between ones of the plurality of outer dimples 432 and ones of the plurality of inner dimples 434, may be between 0.5 inches (12.7 mm) and 1.5 inches (38.1 mm), or between 0.75 inches (19.05 mm) and 1.25 inches (31.75 mm), or be about 1.0 inches (25.4 mm). In various embodiments, a diameter or characteristic dimension of each dimple within the pluralities of dimples may be about 0.2 inches (5.08 mm) ±0.15 inches (3.81 mm).

As described above with reference to FIGS. 3A and 3B, while the foregoing describes the tab members being formed from the inner layer of material and the crimped portion being formed from the outer layer of material, the disclosure contemplates no preference in this regard and, further, contemplates the tab members and the crimped portion may be formed from either layers of material—e.g., the tab members may be formed from the outer layer of material and the crimped portion may be formed from the inner layer of material. Further, the disclosure contemplates the first surface or the first layer of material may comprise, respectively, either the inner surface or the outer surface or the inner layer of material or the outer layer of material, as may the second surface and the second layer of material.

Figure 5:
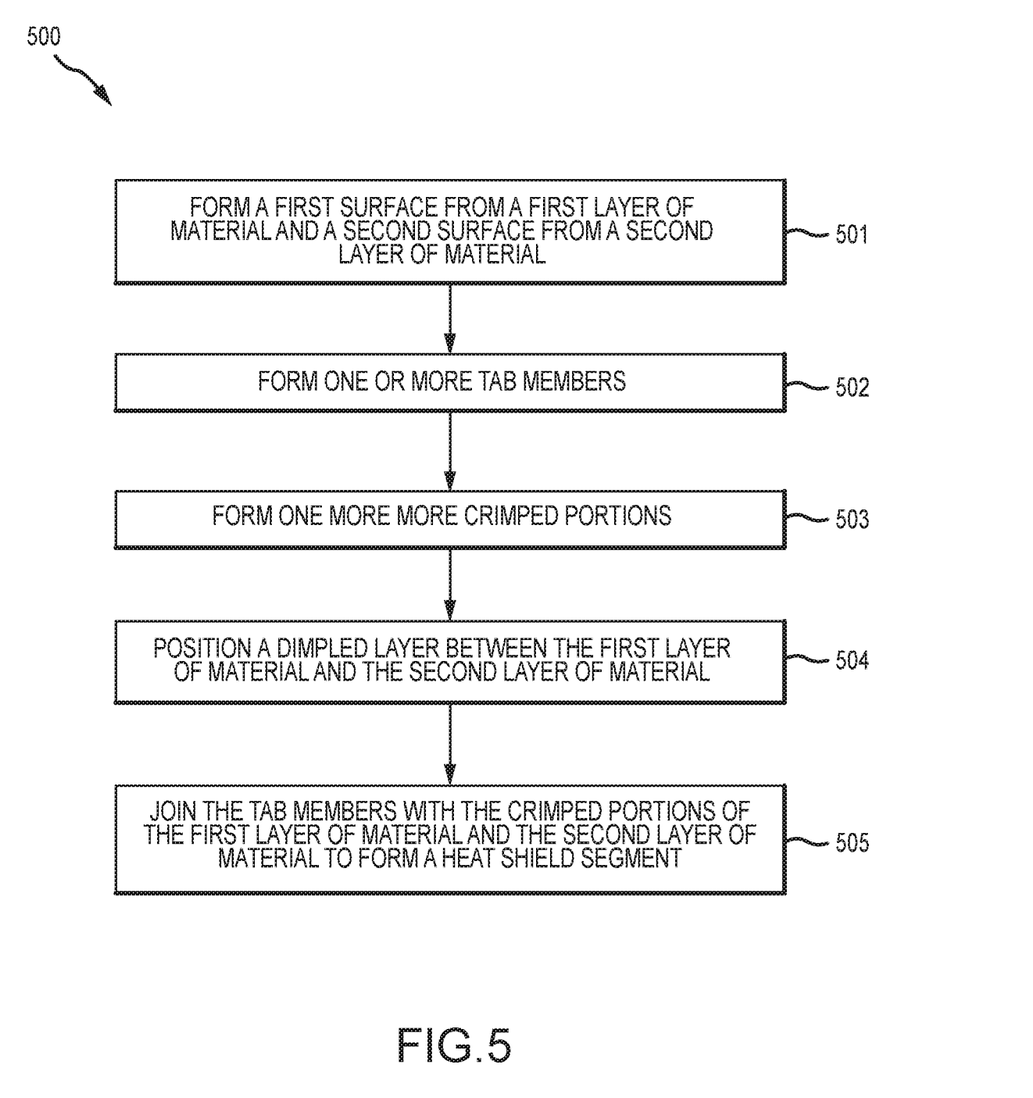
FIG. 5 describes a method of manufacturing a segmented heat shield, in accordance with various embodiments.

Referring now to FIG. 5, a method 500 of manufacturing a heat shield segment, such as, for example, the heat shield segment 300 described above with reference to FIGS. 3A and 3B, or the heat shield segment 400 described above with reference to FIGS. 4A, 4B and 4C is described. In a first step 501, the method includes forming an outer surface from an outer layer of material and an inner surface from an inner layer of material. In various embodiments, the outer surface and the inner surface exhibit a radial curvature along a circumferential distance of the respective layers. In a second step 502, one or more tab members are formed along one or both of the axial extending edges of the inner layer of material or the outer layer of material. In a third step 503, one or more crimped portions are formed along the axial extending edges of the inner layer of material or the outer layer of material corresponding to the one or more tab members. In a fourth step 504, a dimpled structure or layer of material is positioned intermediate the inner layer of material and the outer layer of material. In a fifth step 505, the inner layer of material and the outer layer of material are joined at the tab members and the corresponding crimped portions to form a heat shield segment. In various embodiments, the dimpled structure may be inserted between the inner layer of material and the outer layer of material prior to or following the joining of the layers.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

In various embodiments, system program instructions or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found by In Re Nuijten to fall outside the scope of patentable subject matter under 35 U.S.C. § 101.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed:

1. A heat shield assembly defining a first circumferential side and a second circumferential side, the first circumferential side and the second circumferential side being spaced a circumferential distance along a circumferential direction, and an inboard end and an outboard end, the inboard end and the outboard end being spaced an axial distance along an axial direction, comprising:
   a first layer defining a first surface of the heat shield assembly and having a first tab member disposed proximate the inboard end at the first circumferential side and a second tab member disposed proximate the outboard end at the first circumferential side;
   a second layer defining a second surface of the heat shield assembly and having one or more first crimped portions extending along the first circumferential side and configured to engage the first tab member and the second tab member; and
   an intermediate layer disposed between the first layer and the second layer,
   wherein the intermediate layer comprises a sheet having a first plurality of dimples and a second plurality of dimples formed therein including an axial spacing between each dimple in the first plurality of dimples and each dimple in the second plurality of dimples, the first plurality of dimples oriented toward the first layer and the second plurality of dimples oriented toward the second layer, and
   wherein the first plurality of dimples is configured to contact the first layer and the second plurality of dimples is configured to contact the second layer.

2. The heat shield assembly of claim 1, wherein the first layer includes a third tab member disposed proximate the inboard end at the second circumferential side and a fourth tab member disposed proximate the outboard end at the second circumferential side and the second layer includes one or more second crimped portions extending along the second circumferential side and configured to engage the third tab member and the fourth tab member.

3. The heat shield assembly of claim 2, wherein the first layer is an inner layer defining a radially inner surface of the heat shield assembly and the second layer is an outer layer defining a radially outer surface of the heat shield assembly.

4. The heat shield assembly of claim 2, wherein the inboard end includes an aperture configured to receive a fastener extending between a torque bar and a wheel.

5. The heat shield assembly of claim 4, wherein the inboard end includes a chin ring extending between the first circumferential side and the second circumferential side.

6. The heat shield assembly of claim 1, wherein the axial spacing is between 0.5 inches and 1.5 inches.

7. The heat shield assembly of claim 1,
wherein the first plurality of dimples includes a plurality of axially spaced dimples, spaced in the axial direction, and a plurality of circumferentially spaced dimples, spaced in the circumferential direction, and
wherein the second plurality of dimples includes a plurality of axially spaced dimples, spaced in the axial direction, a plurality of circumferentially spaced dimples, spaced in the circumferential direction.

8. An assembly, comprising:
a wheel having a wheel well and configured to rotate about an axis;
a brake mechanism disposed radially inward of the wheel well; and
a heat shield disposed radially inward of the wheel well and radially outward of the brake mechanism, the heat shield defining a first circumferential side and a second circumferential side, the first circumferential side and the second circumferential side being spaced a circumferential distance along a circumferential direction, and an inboard end and an outboard end, the inboard end and the outboard end being spaced an axial distance along an axial direction, comprising:
a first layer having a first tab member disposed proximate the inboard end at the first circumferential side and a second tab member disposed proximate the outboard end at the first circumferential side;
a second layer having one or more first crimped portions extending along the first circumferential side and configured to engage the first tab member and the second tab member; and
an intermediate layer disposed between the first layer and the second layer,
wherein the intermediate layer comprises a sheet having a first plurality of dimples and a second plurality of dimples formed therein including an axial spacing between each dimple in the first plurality of dimples and each dimple in the second plurality of dimples, the first plurality of dimples oriented toward the first layer and the second plurality of dimples oriented toward the second layer, and
wherein the first plurality of dimples is configured to contact the first layer and the second plurality of dimples is configured to contact the second layer.

9. The assembly of claim 8, wherein the first layer includes a third tab member disposed proximate the inboard end at the second circumferential side and a fourth tab member disposed proximate the outboard end at the second circumferential side and the second layer includes one or more second crimped portions extending along the second circumferential side and configured to engage the third tab member and the fourth tab member.

10. The assembly of claim 8, wherein the first layer is an inner layer defining a radially inner surface of the heat shield assembly and the second layer is an outer layer defining a radially outer surface of the heat shield.

11. The assembly of claim 10, wherein the inboard end includes an aperture configured to receive a fastener extending between a torque bar and the wheel.

12. The assembly of claim 8, wherein the axial spacing is at least 0.5 inches.

13. The assembly of claim 8,
wherein the first plurality of dimples includes a plurality of axially spaced dimples, spaced in the axial direction, and a plurality of circumferentially spaced dimples, spaced in the circumferential direction, and
wherein the second plurality of dimples includes a plurality of axially spaced dimples, spaced in the axial direction, a plurality of circumferentially spaced dimples, spaced in the circumferential direction.

14. A method of manufacturing a heat shield segment, the heat shield segment defining a first circumferential side and a second circumferential side, the first circumferential side and the second circumferential side being spaced a circumferential distance along a circumferential direction, and an inboard end and an outboard end, the inboard end and the outboard end being spaced an axial distance along an axial direction, comprising:
forming a first surface from a first layer of material and a second surface from a second layer of material;
forming one or more tab members along a first edge of the first layer of material;
forming one or more crimped-portions along a second edge of the second layer of material;
positioning a dimpled structure intermediate the first layer of material and the second layer of material; and
joining the first layer of material and the second layer of material, at the one or more tab members and at the one or more crimped-portions, to form the heat shield segment,
wherein the dimpled structure includes a material layer having a first plurality of dimples configured to contact the first layer of material and a second plurality of dimples configured to contact the second layer of material and
wherein each dimple of the first plurality of dimples is axially spaced, in the axial direction, from each dimple of the second plurality of dimples.

15. The method of claim 14,
wherein the first plurality of dimples includes a plurality of axially spaced dimples, spaced in the axial direction, and a plurality of circumferentially spaced dimples, spaced in the circumferential direction, and
wherein the second plurality of dimples includes a plurality of axially spaced dimples, spaced in the axial direction, a plurality of circumferentially spaced dimples, spaced in the circumferential direction.

* * * * *